(12) United States Patent
Sun

(10) Patent No.: US 8,526,714 B2
(45) Date of Patent: Sep. 3, 2013

(54) METHOD AND SYSTEM FOR RECONSTRUCTING A STEREOSCOPIC IMAGE STREAM FROM QUINCUNX SAMPLED FRAMES

(75) Inventor: Wei-Ting Sun, Tainan County (TW)

(73) Assignee: Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 293 days.

(21) Appl. No.: 13/006,375

(22) Filed: Jan. 13, 2011

(65) Prior Publication Data

US 2012/0183201 A1 Jul. 19, 2012

(51) Int. Cl.
*G06K 9/00* (2006.01)
*G06K 9/36* (2006.01)
*H04N 3/14* (2006.01)

(52) U.S. Cl.
USPC ............ 382/154; 382/233; 382/276; 348/272

(58) Field of Classification Search
USPC ......................................................... 382/154
See application file for complete search history.

(56) References Cited

U.S. PATENT DOCUMENTS

| | | | | |
|---|---|---|---|---|
| 7,576,783 B2 * | 8/2009 | Hwang et al. | ............... | 348/222.1 |
| 7,825,965 B2 * | 11/2010 | Achong et al. | ................ | 348/246 |
| 7,859,580 B2 * | 12/2010 | Quan | ............................ | 348/273 |

* cited by examiner

*Primary Examiner* — David Zarka
(74) *Attorney, Agent, or Firm* — Winston Hsu; Scott Margo

(57) ABSTRACT

A method for reconstructing a stereoscopic image stream from a plurality of compressed frames is provided. Each compressed frame consists of a merged image formed by juxtaposing a sampled image frame of a left image and a sampled image frame of a right image. Each sampled image frame has half a number of original pixels disposed at intersections of a plurality of horizontal lines and a plurality of vertical lines in a staggered quincunx pattern in which original pixels surround missing pixels. Each missing pixel is reconstructed according to at least 5 horizontal pixel pairs and 3 vertical pixel pairs in a compressed frame.

12 Claims, 3 Drawing Sheets

METHOD AND SYSTEM FOR RECONSTRUCTING A STEREOSCOPIC IMAGE STREAM FROM QUINCUNX SAMPLED FRAMES

BACKGROUND OF THE INVENTION

1. Field of the Invention

The present invention is related to a method and a system for processing a stereoscopic image stream, and more particularly, to a method and a system for reconstructing a stereoscopic image stream from quincunx sampled frames.

2. Description of the Prior Art

Three-dimensional (3D) display technology provides more vivid visual experiences than traditional two-dimensional (2D) display technology. In general, the stereoscopic image processing involves two camera systems in which two different images or videos are taken from slightly different camera angles and locations. Techniques to artificially create a perception of depth on a 2D surface include the use of presenting different images to the left and right eyes of the viewer. In such frame sequential 3D display system, a sequence of alternating frames wherein each successive frame carries the image meant for one or the other eye is presented to each eye using shutter glasses having a left-eye lens and a right-eye lens, each of which may be made from electronically controllable liquid crystal assemblies. The lenses are configured to be alternatively switched on and off in sync with the alternating frames such that the right eye only views the right-eye images and the left eye only views the left-eye images. The two series of images are combined by the brain in such a way to perceive depth.

Most recently released 3D high-definition televisions (HDTVs) operate according to the frame sequential 3D display method described above. However, this doesn't mean that the input signal to the 3D HDTV has to be in a frame-sequential format. Instead, many 3D HDTVs can process signals in a variety of different formats and perform on-the-fly conversion of the incoming video signal into a frame sequential format. While frame-sequential 3D is part of the blu-ray 3D specification, the video data in a side-by-side format is often preferred when it comes to airing 3D content over cable/air.

FIGS. 1A-1D are diagrams illustrating a prior art method for encoding 3D images. FIG. 1A depicts an original left-eye frame L and an original right-eye frame R of the same full resolution, such as 1920×1080. In FIG. 1B, the left-eye frame L and the right-eye frame R are processed by quincunx sampling, which, as well-known to those skilled in the art, is a sampling method by which sampling of odd pixels alternates with sampling of even pixels for consecutive rows, such that the sampled pixels form a checkerboard pattern, thereby resulting in a sampled left-eye frame L' and a sampled right-eye frame R'. In FIG. 1C, the remaining pixels are slid in the horizontal direction for providing a down-scaled left-eye frame L" (consisting of pixels marked by diagonal stripes which go top right to bottom left) with a resolution of 960× 1080 and a down-scaled right-eye frame R" (consisting of pixels marked by diagonal stripes which go top left to bottom right) with a resolution of 960×1080. In FIG. 1D, the down-scaled left-eye frame L" and the down-scaled right-eye frame R" are placed side-by-side, thereby forming the side-by-side frame SBS.

Since the side-by-side frame SBS contains half the pixels compared to those in the original left-eye frame L and the original right-eye frame R, it can be transmitted more efficiently. However, the missing pixels that have been lost by quincunx sampling need to be reconstructed for playback, normally according to several known interpolation algorithms. Examples of such algorithms include nearest neighbor interpolation which directly applies data from the neighboring pixels to recreate the missing pixel. Unfortunately, such an algorithm produces diagonal line artifacts which result in a deteriorated reconstructed image. There is thus a need for a method capable of generating a stereoscopic image stream with better quality by reconstructing missing pixels of quincunx sampled frames.

SUMMARY OF THE INVENTION

The present invention provides a method for reconstructing a stereoscopic image stream from a plurality of compressed frames each consisting of a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels. For a missing pixel located at an intersection of an $n^{th}$ horizontal line among an $(n-1)^{th}$ to an $(n+1)^{th}$ adjacent horizontal lines and an $n^{th}$ vertical line among an $(n-2)^{th}$ to an $(n+2)^{th}$ adjacent vertical lines, the method includes providing a first intermediate value according to a first horizontal pixel pair having a first pixel located at an intersection of the $n^{th}$ horizontal line and the $(n-1)^{th}$ vertical line and a second pixel located at an intersection of the $n^{th}$ horizontal line and the $(n+1)^{th}$ vertical line, and then storing the first intermediate in a storage unit; providing a second intermediate value according to a first vertical pixel pair having a third pixel located at an intersection of the $(n-1)^{th}$ horizontal line and the $n^{th}$ vertical line and a fourth pixel located at an intersection of the $(n+1)^{th}$ horizontal line and the $n^{th}$ vertical line, and then storing the second intermediate in the storage unit; providing a horizontal sensitivity parameter according to the first horizontal pixel pair, at least three neighboring pixels located along the $(n-1)^{th}$ horizontal line and at least three neighboring pixels located along the $(n+1)^{th}$ horizontal line, and then storing the horizontal sensitivity parameter in the storage unit; providing a vertical sensitivity parameter according to the first vertical pixel pair, at least two neighboring pixels located along the $(n-2)^{th}$ vertical line and at least two neighboring pixels located along the $(n+2)^{th}$ vertical line, and then storing the vertical sensitivity parameter in the storage unit; and reconstructing the missing pixel by weighting the first intermediate value and the second intermediate value according to the horizontal sensitivity parameter and the vertical sensitivity parameter.

The present invention provides a system for reconstructing a stereoscopic image stream from a plurality of compressed frames. The system includes an image source, a stereoscopic image processor, and a display device. The image source provides the plurality of compressed frames each consisting of a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels. The stereoscopic image processor includes an input buffer for receiving the plurality of compressed frames; a spatial interpolator configured to generate the stereoscopic image stream by reconstructing missing pixels of each of the left and right images by means of interpolation; a storage unit for storing the first intermediate value, the second intermediate value, the horizontal sensitivity parameter and the vertical sensitivity parameter; and an output buffer for outputting the stereoscopic image stream. For a missing pixel located at an intersection of an $n^{th}$ horizontal line among an $(n-1)^{th}$ to an $(n+1)^{th}$ adjacent horizontal lines and an $n^{th}$ vertical line among an $(n-2)^{th}$ to an $(n+2)^{th}$ adjacent vertical lines, the interpolation includes providing a first intermediate value according to a first horizontal pixel pair having a first pixel located at an intersection of the $n^{th}$ horizontal line and the $(n-1)^{th}$ vertical line and a second pixel located at an intersection of the $n^{th}$ horizontal line and the $(n+1)^{th}$ vertical line; providing a second intermediate value according to a first vertical pixel pair having a third pixel located at an intersection of the $(n-1)^{th}$ horizontal line and the $n^{th}$ vertical line and a fourth pixel located at an intersection of the $(n+1)^{th}$ horizontal line and the $n^{th}$ vertical line; providing a horizontal sensitivity parameter according to the first horizontal pixel pair, at least three neighboring pixels located along the $(n-1)^{th}$ horizontal line and at least three neighboring pixels located along the $(n+1)^{th}$ horizontal line; providing a vertical sensitivity parameter according to the first vertical pixel pair, at least two neighboring pixels located along the $(n-2)^{th}$ vertical line and at least two neighboring pixels located along the $(n+2)^{th}$ vertical line; and reconstructing the missing pixel by weighting the first intermediate value and the second intermediate value according to the horizontal sensitivity parameter and the vertical sensitivity parameter; and generating the stereoscopic image stream according to the reconstructed pixel associated with the missing pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
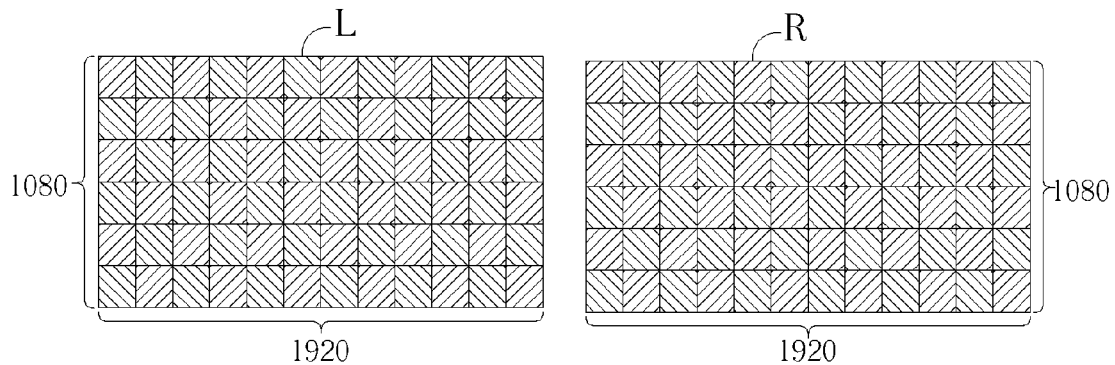
FIGS. 1A-1D are diagrams illustrating a prior art method for encoding 3D images.
Figure 1B:
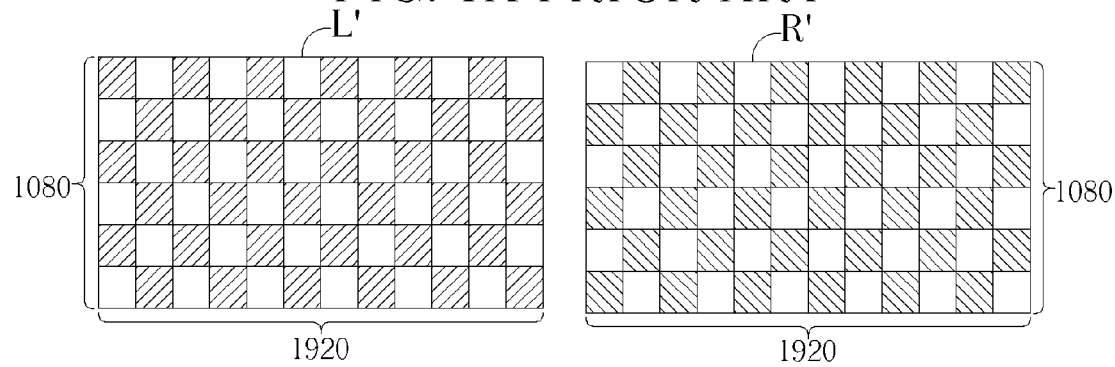
Figure 1C:
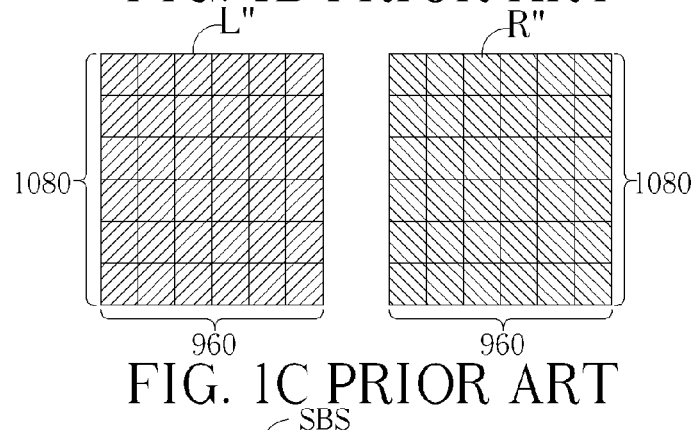
Figure 1D:
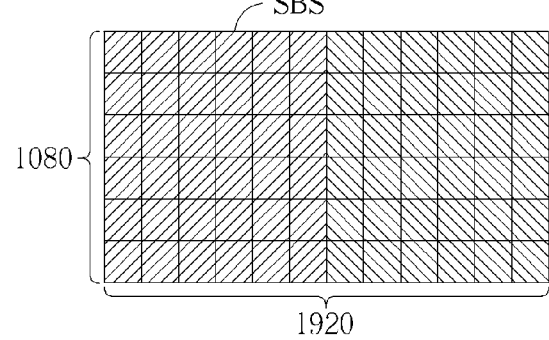
Figure 2:
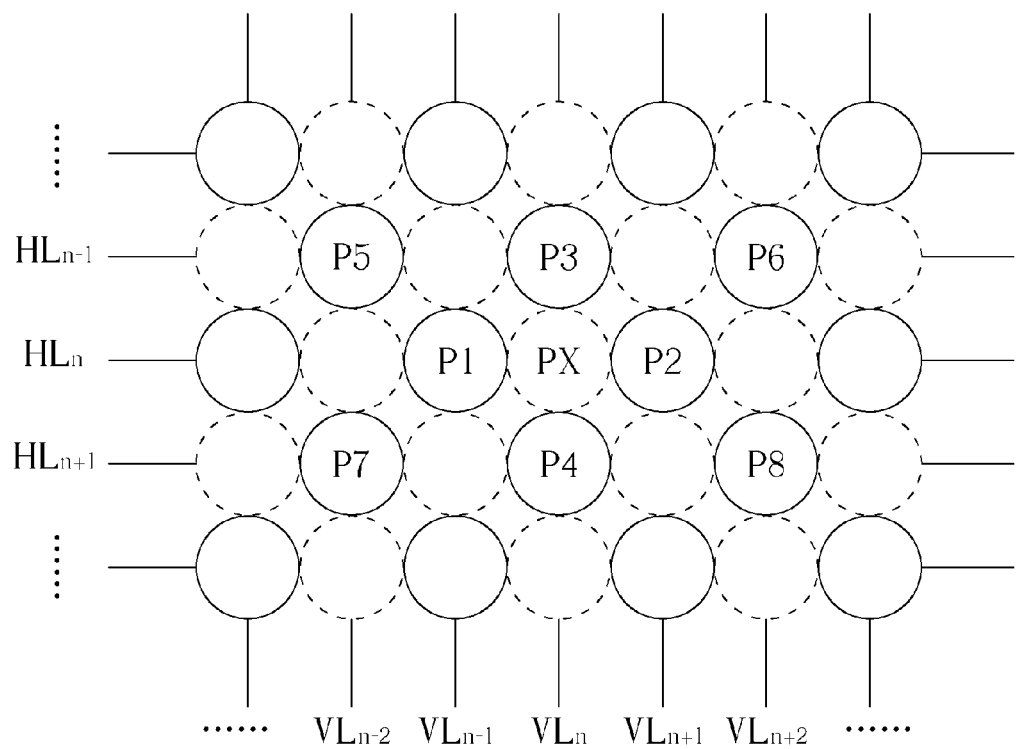
FIG. 2 is a diagram illustrating a method for reconstructing stereoscopic images according to the present invention.

FIG. 2 is a diagram illustrating a method for reconstructing stereoscopic images according to the present invention. FIG. 2 shows a sampled image frame in the quincunx pattern, wherein the remaining pixels are represented by solid circles and the missing pixels are represented by dotted circles. In an embodiment of the present invention, the remaining pixels located at intersections of 3 adjacent horizontal lines $HL_{n-1}$-$HL_{n+1}$ and 5 adjacent vertical lines $VL_{n-2}$-$VL_{n+2}$ are used for reconstructing a corresponding missing pixel PX which is located at the intersection of the horizontal line $HL_n$ and the vertical line $VL_n$. As depicted in FIG. 2, the missing pixel PX may be reconstructed according to the remaining pixels P1–P8.

First, the 4 adjacent pixels P1–P4 of the missing pixel PX are used for calculating a first intermediate value $M_1$ and a second intermediate value $M_2$:

$$M_1=(P1+P2)/2 \quad (1)$$

$$M_2=(P3+P4)/2 \quad (2)$$

Next, 5 horizontal pixel pairs formed by the pixels P1–P8 are used for calculating a horizontal sensitivity parameter $W_H$, and 3 vertical pixel pairs formed by the pixels P3–P8 are used for calculating a vertical sensitivity parameter $W_V$:

$$W_H=|P1-P2|+(|P5-P3|+|P3-P6|+|P7-P4|+|P4-P8|)/2 \quad (3)$$

$$W_V=|P5-P7|+|P3-P4|+|P6-P8| \quad (4)$$

If the sum of the horizontal sensitivity parameter $W_H$ and the sum of the vertical sensitivity parameter $W_V$ is equal to zero ($W_H+W_V=0$), the missing pixel PX can be reconstructed by averaging the first intermediate value $M_1$ and the second intermediate value $M_2$. If the sum of the horizontal sensitivity parameter $W_H$ and the sum of the vertical sensitivity parameter $W_V$ is not equal to zero ($W_H+W_V \neq 0$), the missing pixel PX can be reconstructed by weighting the first intermediate value $M_1$ and the second intermediate value $M_2$ according to the horizontal sensitivity parameter $W_H$ and the vertical sensitivity parameter $W_V$. The value of the reconstructed missing pixel PX is illustrated as follows:

$$PX=(M_1+M_2)/2, \text{ if } W_H+W_V=0 \quad (5)$$

$$PX=(M_2*W_H+M_1*W_V)/(W_H+W_V), \text{ if } W_H+W_V \neq 0 \quad (6)$$

Normally, most area of an image have smooth changes, which means the original value of a missing pixel before down-sampling is very likely to be similar to its surrounding pixels. However, instead of reconstructing the missing pixel PX by directly averaging the four surrounding pixels P1–P4, the contribution of the pixels P5–P8 is also taken into account in the present invention.

As shown in equations (1) and (2), the first intermediate value $M_1$ is associated with a horizontal pixel pair P1–P2, and the second intermediate value $M_2$ is associated with a vertical pixel pair P3–P4.

As shown in equation (3), the horizontal sensitivity parameter $W_H$ of the missing pixel PX is associated with five horizontal pixel pairs: two horizontal pixel pairs P5–P3 and P3–P6 located on the horizontal line $HL_{n-1}$, two horizontal pixel pairs P7–P4 and P4–P8 located on the horizontal line $HL_{n+1}$, and the horizontal pixel pair P1–P2 located on the horizontal line $HL_n$. As shown in equation (4), the vertical sensitivity parameter $W_V$ of the missing pixel PX is associated with three vertical pixel pairs: a vertical pixel pair P5–P7 located on the vertical line $VL_{n-1}$, a vertical pixel pair P6–P8 located on the vertical line $VL_{n+1}$, and the vertical pixel pair P3–P4 located on the vertical line $VL_n$.

Since the horizontal sensitivity parameter $W_H$ is calculated according to 5 horizontal pixel pairs and the vertical sensitivity parameter $W_V$ is calculated according to 3 vertical pixel pairs, the present invention may also include normalization. For example, the horizontal sensitivity parameter $W_H$ may include the full contribution of the most dominant horizontal pixel pair P1–P2, while the contributions of the 4 less dominant horizontal pixel pairs are weighted according to the number of horizontal pixel pairs involved. The vertical sensitivity parameter $W_V$ may include the full contribution of the most dominant vertical pixel pair P3–P4, while the contributions of the 2 less dominant vertical pixel pairs are weighted according to the number of horizontal pixel pairs involved. In other words, the sum of the 4 horizontal pixel pairs P5–P3, P3–P6, P7–P4 and P4–P8 is divided by 2 (weighted by 2/4) in the equation (3), while the 2 vertical pixel pairs P5–P7 and P6–P8 are weighted by 1 in the equation (4).

The situation indicated by equation (5) only occurs when all the pixel pairs are equal to zero, and the missing pixel PX is reconstructed with 0 in this case. When $W_H+W_V \neq 0$ as indicated by equation (6), the missing pixel PX is reconstructed with an interpolated value $(M_2*W_H+M_1*W_V)/(W_H+W_V)$ which includes the contribution of multiple surrounding pixel pairs.

In the embodiment illustrated in FIG. 2, the 8 remaining pixels P1–P8 located at intersections of 3 adjacent horizontal lines $HL_{n-1}$-$HL_{n+1}$ and 5 adjacent vertical lines $VL_{n-2}$-$VL_{n+2}$ are used for reconstructing the missing pixel PX which is located at the intersection of the horizontal line $HL_n$ and the vertical line $VL_n$. In other embodiments, more remaining pixels may be used for reconstructing the missing pixel PX. For example, assume that the horizontal sensitivity parameter $W_H$ is calculated according to the most dominant horizontal pixel pair P1–P2 and $N_H$ less dominant horizontal pixel pairs, and the vertical sensitivity parameter $W_V$ is calculated according to the most dominant horizontal pixel pair P3–P4 and $N_V$ less dominant vertical pixel pairs. The horizontal sensitivity parameter $W_H$ and the vertical sensitivity parameter $W_V$ may be represented by:

$$W_H=|P1-P2|+K_H*(DH(1)+DH(2)+\ldots DH(N_H)) \quad (7)$$

$$W_V=|P3-P4|+K_V*(DV(1)+DV(2)+\ldots DV(N_V)) \quad (8)$$

wherein $K_H*N_H=K_V*N_V$ (9)

$DH(1)$–$DH(N_H)$ represent the absolute value of the difference between each corresponding horizontal pixel pairs, and $DV(1)$–$DV(N_V)$ represent the absolute value of the difference between each corresponding vertical pixel pairs. The horizontal sensitivity parameter $W_H$ includes the full contribution of the most dominant horizontal pixel pair P1–P2, while the contributions of the less dominant horizontal pixel pairs are weighted by a normalization factor $K_H$. The vertical sensitivity parameter $W_V$ includes the full contribution of the most dominant vertical pixel pair P3–P4, while the contributions of the less dominant vertical pixel pairs are weighted by a normalization factor $K_V$. The normalization factors $K_H$ and $K_V$ are associated as indicated in equation (9) so that the values of the horizontal sensitivity parameter $W_H$ and the vertical sensitivity parameter $W_V$ may be contributed by the same number of pixel pairs.

In addition to the horizontal pixel pair P1–P2, P5–P3, P3–P6, P7–P4 and P4–P8 used in the embodiment of FIG. 2, the $N_H$ horizontal pixel pairs may further include other horizontal pixel pairs each located along the adjacent horizontal line $H_{n-1}$ or $H_{n+1}$, or may further include one or more horizontal pixel pairs each located along other horizontal lines, such as $H_{n-2}$ or $H_{n+2}$. In addition to the vertical pixel pair P3–P4, P5–P7, and P6–P8 used in the embodiment of FIG. 2, the $N_V$ vertical pixel pairs may include other vertical pixel pairs each located along the vertical lines $V_{n-2}$, $V_n$ or $V_{n+2}$, or may include other vertical pixel pairs each located along other vertical lines, such as $V_{n-4}$ or $V_{n+4}$.

Figure 3:
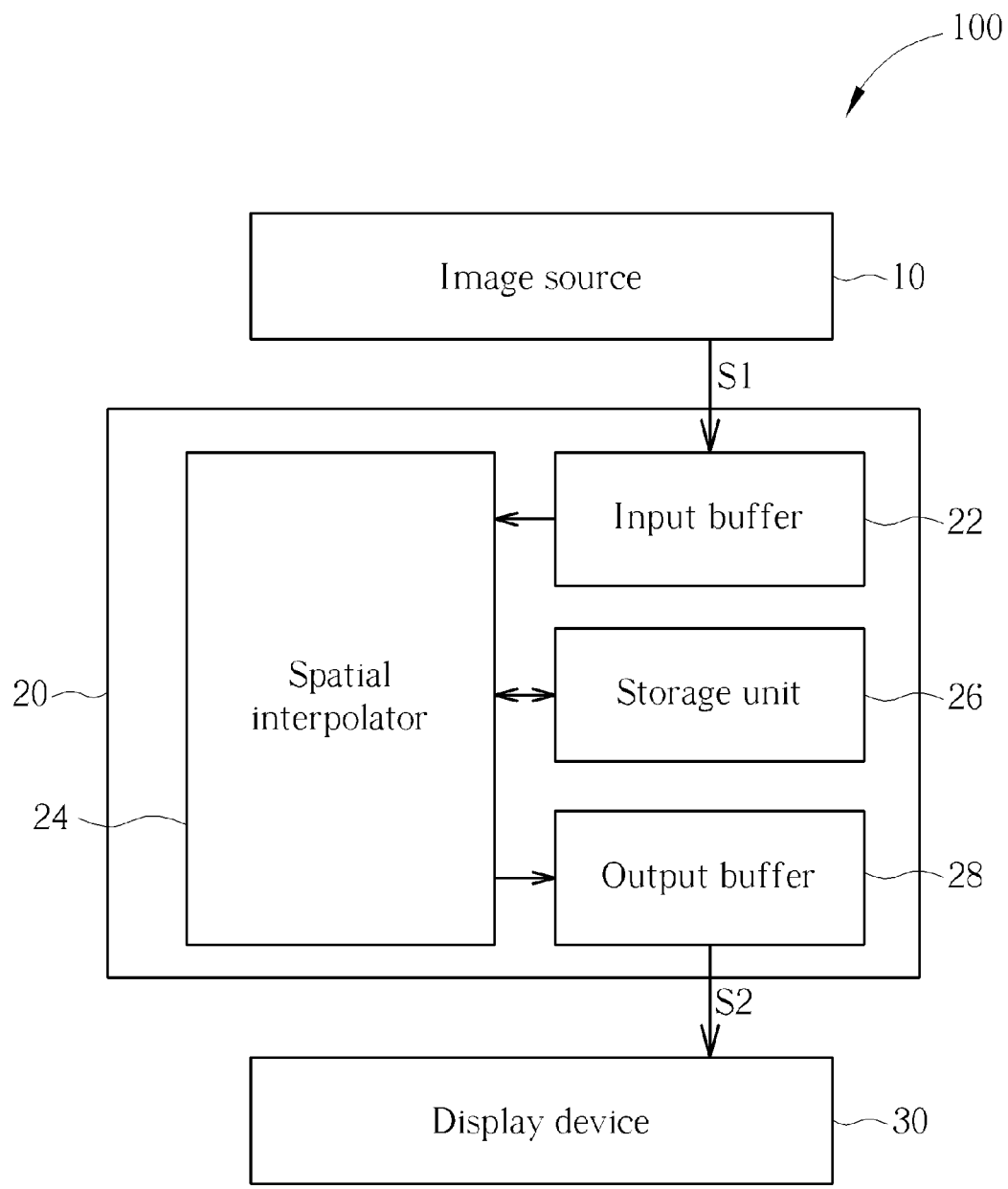
FIG. 3 is a block diagram illustrating a 3D display system 100 for implementing the present method.

FIG. 3 is a block diagram illustrating a 3D display system 100 for implementing the present method. The 3D display system 100 includes an image source 10, a stereoscopic image processor 20, and a display device 30. The image source 10 may provide a source 2D video signal S1 consisting of multiple side-by-side frames representing an image by means of quincunx sampling as previously illustrated. The stereoscopic image processor 20 includes an input buffer 22, a spatial interpolator 24, a storage unit 26, and an output buffer 28. The input buffer 22 is configured to receive the source 2D video signal S1 for subsequent processing. The spatial interpolator 24 is configured to interpolate missing pixels in the 2D video signal S1 using the interpolation method illustrated in equations (1)-(9), thereby generating a 3D video signal S2 having reconstructed frames each containing half original pixels and half interpolated pixels. The storage unit 26 is used for storing intermediate results during the interpolation. The 3D video signal S2 may then be transmitted to the display device 30 via the output buffer 28 for playback. In more detail, the stereoscopic image processor 20 may further convert the 3D video signal S2 into a corresponding format, such as anaglyph or interline . . . etc, according to the type of the display device 30, and the converting operation may be executed in the post-end of the spatial interpolator 24.

Those skilled in the art will readily observe that numerous modifications and alterations of the device and method may be made while retaining the teachings of the invention.

What is claimed is:

1. A method for reconstructing a stereoscopic image stream from a plurality of compressed frames using a stereoscopic image processor, each compressed frame comprising a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels, the method comprising:

for a missing pixel located at an intersection of an nth horizontal line among an (n−1)th to an (n+1)th adjacent horizontal lines and an nth vertical line among an (n−2)th to an (n+2)th adjacent vertical lines:

providing a first intermediate value according to a first horizontal pixel pair having a first pixel located at an intersection of the nth horizontal line and the (n−1)th vertical line and a second pixel located at an intersection of the nth horizontal line and the (n+1)th vertical line, and then storing the first intermediate in a storage unit;

providing a second intermediate value according to a first vertical pixel pair having a third pixel located at an intersection of the (n−1)th horizontal line and the nth vertical line and a fourth pixel located at an intersection of the (n+1)th horizontal line and the nth vertical line, and then storing the second intermediate in the storage unit;

providing a horizontal sensitivity parameter according to the first horizontal pixel pair, a second horizontal pixel pair having a fifth pixel and the third pixel, a third horizontal pixel pair having the third pixel and a sixth pixel, a fourth horizontal pixel pair having a seventh pixel and the fourth pixel, a fifth horizontal pixel pair having the fourth pixel and an eighth pixel, wherein:

the fifth pixel is located at an intersection of the (n−1)th horizontal line and the (n−2)th vertical line;

the sixth pixel is located at an intersection of the (n−1)th horizontal line and the (n+2)th vertical line;

the seventh pixel is located at an intersection of the (n+1)th horizontal line and the (n−2)th vertical line; and the eighth pixel is located at an intersection of the (n+1)th horizontal line and the (n+2)th vertical line;

providing a vertical sensitivity parameter according to the first vertical pixel pair, at least two neighboring pixels located along the (n−2)th vertical line and at least two neighboring pixels located along the (n+2)th vertical line, and then storing the vertical sensitivity parameter in the storage unit; and reconstructing the missing pixel by weighting the first intermediate value and the second intermediate value according to the horizontal sensitivity parameter and the vertical sensitivity parameter.

2. The method of claim 1 wherein the horizontal sensitivity parameter is providing by computing |P1−P2|+(|P5−P3|+|P3−P6|+|P7−P4|+|P4−P8|)/4, wherein P1−P8 represent values of the first to eighth pixels, respectively.

3. The method of claim 1, further comprising:
providing the first intermediate value by averaging values of the first pixel and the second pixel; and
providing the second intermediate value by averaging values of the third pixel and the fourth pixel.

4. A method for reconstructing a stereoscopic image stream from a plurality of compressed frames using a stereoscopic image processor, each compressed frame comprising of a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels, the method comprising:
for a missing pixel located at an intersection of an nth horizontal line among an (n−1)th to an (n+1)th adjacent horizontal lines and an nth vertical line among an (n−2)th to an (n+2)th adjacent vertical lines:
providing a first intermediate value according to a first horizontal pixel pair having a first pixel located at an intersection of the nth horizontal line and the (n−1)th vertical line and a second pixel located at an intersection of the nth horizontal line and the (n+1)th vertical line, and then storing the first intermediate in a storage unit;
providing a second intermediate value according to a first vertical pixel pair having a third pixel located at an intersection of the (n−1)th horizontal line and the nth vertical line and a fourth pixel located at an intersection of the (n+1)th horizontal line and the nth vertical line, and then storing the second intermediate in the storage unit;
providing a horizontal sensitivity parameter according to the first horizontal pixel pair, at least three neighboring pixels located along the (n−1)th horizontal line and at least three neighboring pixels located along the (n+1)th horizontal line, and then storing the horizontal sensitivity parameter in the storage unit;
providing the vertical sensitivity parameter according to the first vertical pixel pair, a second vertical pixel pair having a fifth pixel and a seventh pixel, and a third vertical pixel pair having a sixth pixel and an eighth pixel, wherein:
the fifth pixel is located at an intersection of the (n−1)th horizontal line and the (n−2)th vertical line;
the sixth pixel is located at an intersection of the (n−1)th horizontal line and the (n+2)th vertical line;
the seventh pixel is located at an intersection of the (n+1)th horizontal line and the (n−2)th vertical line; and
the eighth pixel is located at an intersection of the (n+1)th horizontal line and the (n+2)th vertical line; and
reconstructing the missing pixel by weighting the first intermediate value and the second intermediate value according to the horizontal sensitivity parameter and the vertical sensitivity parameter.

5. The method of claim 4 wherein the vertical sensitivity parameter is providing by computing |P3−P4|+|P5−P7|+|P6−P8|, wherein P3−P8 represent values of the third to eighth pixels, respectively.

6. A method for reconstructing a stereoscopic image stream from a plurality of compressed frames using a stereoscopic image processor, each compressed frame comprising a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels, the method comprising:
for a missing pixel located at an intersection of an nth horizontal line among an (n−1)th to an (n+1)th adjacent horizontal lines and an nth vertical line among an (n−2)th to an (n+2)th adjacent vertical lines:
providing a first intermediate value according to a first horizontal pixel pair having a first pixel located at an intersection of the nth horizontal line and the (n−1)th vertical line and a second pixel located at an intersection of the nth horizontal line and the (n+1)th vertical line, and then storing the first intermediate in a storage unit;
providing a second intermediate value according to a first vertical pixel pair having a third pixel located at an intersection of the (n−1)th horizontal line and the nth vertical line and a fourth pixel located at an intersection of the (n+1)th horizontal line and the nth vertical line, and then storing the second intermediate in the storage unit;
providing a horizontal sensitivity parameter according to the first horizontal pixel pair, at least three neighboring pixels located along the (n−1)th horizontal line and at least three neighboring pixels located along the (n+1)th horizontal line, and then storing the horizontal sensitivity parameter in the storage unit;
providing a vertical sensitivity parameter according to the first vertical pixel pair, at least two neighboring pixels located along the (n−2)th vertical line and at least two neighboring pixels located along the (n+2)th vertical line, and then storing the vertical sensitivity parameter in the storage unit; and
reconstructing the missing pixel by averaging the first intermediate value and the second intermediate value when a sum of the horizontal sensitivity parameter and the vertical sensitivity parameter is equal to zero.

7. A method for reconstructing a stereoscopic image stream from a plurality of compressed frames using a stereoscopic image processor, each compressed frame comprising a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels, the method comprising:
for a missing pixel located at an intersection of an nth horizontal line among an (n−1)th to an (n+1)th adjacent horizontal lines and an nth vertical line among an (n−2)th to an (n+2)th adjacent vertical lines:
providing a first intermediate value according to a first horizontal pixel pair having a first pixel located at an intersection of the nth horizontal line and the (n−1)th vertical line and a second pixel located at an intersection of the nth horizontal line and the (n+1)th vertical line, and then storing the first intermediate in a storage unit;

providing a second intermediate value according to a first vertical pixel pair having a third pixel located at an intersection of the (n−1)th horizontal line and the nth vertical line and a fourth pixel located at an intersection of the (n+1)th horizontal line and the nth vertical line, and then storing the second intermediate in the storage unit;

providing a horizontal sensitivity parameter according to the first horizontal pixel pair, at least three neighboring pixels located along the (n−1)th horizontal line and at least three neighboring pixels located along the (n+1)th horizontal line, and then storing the horizontal sensitivity parameter in the storage unit;

providing a vertical sensitivity parameter according to the first vertical pixel pair, at least two neighboring pixels located along the (n−2)th vertical line and at least two neighboring pixels located along the (n+2)th vertical line, and then storing the vertical sensitivity parameter in the storage unit; and reconstructing the missing pixel by calculating (M1*WV+M2*WH)/(WH+WV) when a sum of the horizontal sensitivity parameter and the vertical sensitivity parameter is not equal to zero, wherein M1 represents the first intermediate value, M2 represents the second intermediate value, WH represents the horizontal sensitivity parameter, and WV represents the vertical sensitivity parameter.

8. A system for reconstructing a stereoscopic image stream from a plurality of compressed frames, the system comprising:

an image source for providing the plurality of compressed frames each comprising a merged image formed by juxtaposing a sampled image frame of a left image and a sampled image frame of a right image, each sampled image frame having half a number of original pixels disposed at intersections of a plurality of horizontal lines and a plurality of vertical lines in a staggered quincunx pattern in which original pixels surround missing pixels;

a stereoscopic image processor comprising:
an input buffer for receiving the plurality of compressed frames;
a spatial interpolator configured to perform following steps for a missing pixel located at an intersection of an nth horizontal line among an (n−1)th to an (n+1)th adjacent horizontal lines and an nth vertical line among an (n−2)th to an (n+2)th adjacent vertical lines:
providing a first intermediate value according to a first horizontal pixel pair having a first pixel located at an intersection of the nth horizontal line and the (n−1)th vertical line and a second pixel located at an intersection of the nth horizontal line and the (n+1)th vertical line;
providing a second intermediate value according to a first vertical pixel pair having a third pixel located at an intersection of the (n−1)th horizontal line and the nth vertical line and a fourth pixel located at an intersection of the (n+1)th horizontal line and the nth vertical line;
providing a horizontal sensitivity parameter according to the first horizontal pixel pair, at least three neighboring pixels located along the (n−1)th horizontal line and at least three neighboring pixels located along the (n+1)th horizontal line;
providing a vertical sensitivity parameter according to the first vertical pixel pair, at least two neighboring pixels located along the (n−2)th vertical line and at least two neighboring pixels located along the (n+2)th vertical line; and
reconstructing the missing pixel by weighting the first intermediate value and the second intermediate value according to the horizontal sensitivity parameter and the vertical sensitivity parameter; and
generating the stereoscopic image stream according to the reconstructed pixel associated with the missing pixel;
a storage unit configured to store the first intermediate value, the second intermediate value, the horizontal sensitivity parameter and the vertical sensitivity parameter; and
an output buffer for outputting the stereoscopic image stream.

9. The system of claim 8, wherein the stereoscopic image processor is configured to:
provide the horizontal sensitivity parameter according to the first horizontal pixel pair, a second horizontal pixel pair having a fifth pixel and the third pixel, a third horizontal pixel pair having the third pixel and a sixth pixel, a fourth horizontal pixel pair having a seventh pixel and the fourth pixel, a fifth horizontal pixel pair having the fourth pixel and an eighth pixel; and
provide the vertical sensitivity parameter according to the first vertical pixel pair, a second vertical pixel pair having the fifth pixel and the seventh pixel, and a third vertical pixel pair having the sixth pixel and the eighth pixel, wherein:
the fifth pixel is located at an intersection of the (n−1)th horizontal line and the (n−2)th vertical line;
the sixth pixel is located at an intersection of the (n−1)th horizontal line and the (n+2)th vertical line;
the seventh pixel is located at an intersection of the (n+1)th horizontal line and the (n−2)th vertical line; and
the eighth pixel is located at an intersection of the (n+1)th horizontal line and the (n+2)th vertical line.

10. The system of claim 9, wherein the stereoscopic image processor is further configured to:
provide the horizontal sensitivity parameter by computing |P1−P2|+(|P5−P3|+|P3−P6|+|P7−P4|+|P4−P8|)/4; and
provide the vertical sensitivity parameter by computing |P3−P4|+|P5−P7|+|P6−P8|; wherein P1−P8 represent values of the first to eighth pixels, respectively.

11. The system of claim 8, wherein the stereoscopic image processor is configured to:
reconstruct the missing pixel by averaging the first intermediate value and the second intermediate value when a sum of the horizontal sensitivity parameter and the vertical sensitivity parameter is equal to zero; and
reconstruct the missing pixel by calculating (M1*WV+M2*WH)/(WH+WV) when the sum of the horizontal sensitivity parameter and the vertical sensitivity parameter is not equal to zero, wherein M1 represents the first intermediate value, M2 represents the second intermediate value, WH represents the horizontal sensitivity parameter, and WV represents the vertical sensitivity parameter.

12. The system of claim 8, wherein the stereoscopic image processor is configured to:
provide the first intermediate value by averaging values of the first pixel and the second pixel; and
provide the second intermediate value by averaging values of the third pixel and the fourth pixel.

* * * * *